United States Patent [19]

Lindsay

[11] 4,364,693
[45] Dec. 21, 1982

[54] TOOL HOLDER

[76] Inventor: Harold W. Lindsay, 2480 NW. Vaughn, Portland, Oreg. 97210

[21] Appl. No.: 218,579

[22] Filed: Dec. 22, 1980

[51] Int. Cl.³ .............................................. B26D 1/00
[52] U.S. Cl. ..................................... 407/104; 407/48; 407/106
[58] Field of Search ............... 407/103, 104, 105, 106, 407/48, 81

[56] References Cited

U.S. PATENT DOCUMENTS

| | | |
|---|---|---|
| 1,240,699 | 9/1917 | Frey et al. ........................... 407/106 |
| 3,097,417 | 7/1963 | Hill . |
| 3,284,874 | 11/1966 | Green et al. . |
| 3,310,859 | 3/1967 | Diemond et al. . |
| 3,341,919 | 9/1967 | Lovendahl . |
| 3,341,920 | 9/1967 | Kelm . |
| 3,533,150 | 10/1970 | Welch . |
| 3,613,198 | 10/1971 | Weber . |
| 3,654,682 | 4/1972 | Newbould . |
| 3,805,351 | 4/1974 | Mayer ................................. 407/104 |

FOREIGN PATENT DOCUMENTS 1948160 11/1977 Fed. Rep. of Germany ...... 407/105

Primary Examiner—Leonidas Vlachos
Attorney, Agent, or Firm—Klarquist, Sparkman, Campbell, Leigh, Whinston & Dellett

[57] ABSTRACT

A cutting tool in which a retention pin releasably holds an insert, or an insert and seat, in place in a recess of a cutter body. The retention pin is fabricated from a blank having a cylindrical body portion with a first axis concurrent with the axis of the cylindrical head thereof, the body portion thereafter being threaded on a second axis angularly disposed with respect to the first axis and intercepting the same at about the mid-point thereof. When the thus threaded pin is inserted into the bore, it rotates the head portion about the second axis, thereby to force the cutter insert against the supporting shoulders while drawing the insert into engagement with the seat.

4 Claims, 7 Drawing Figures

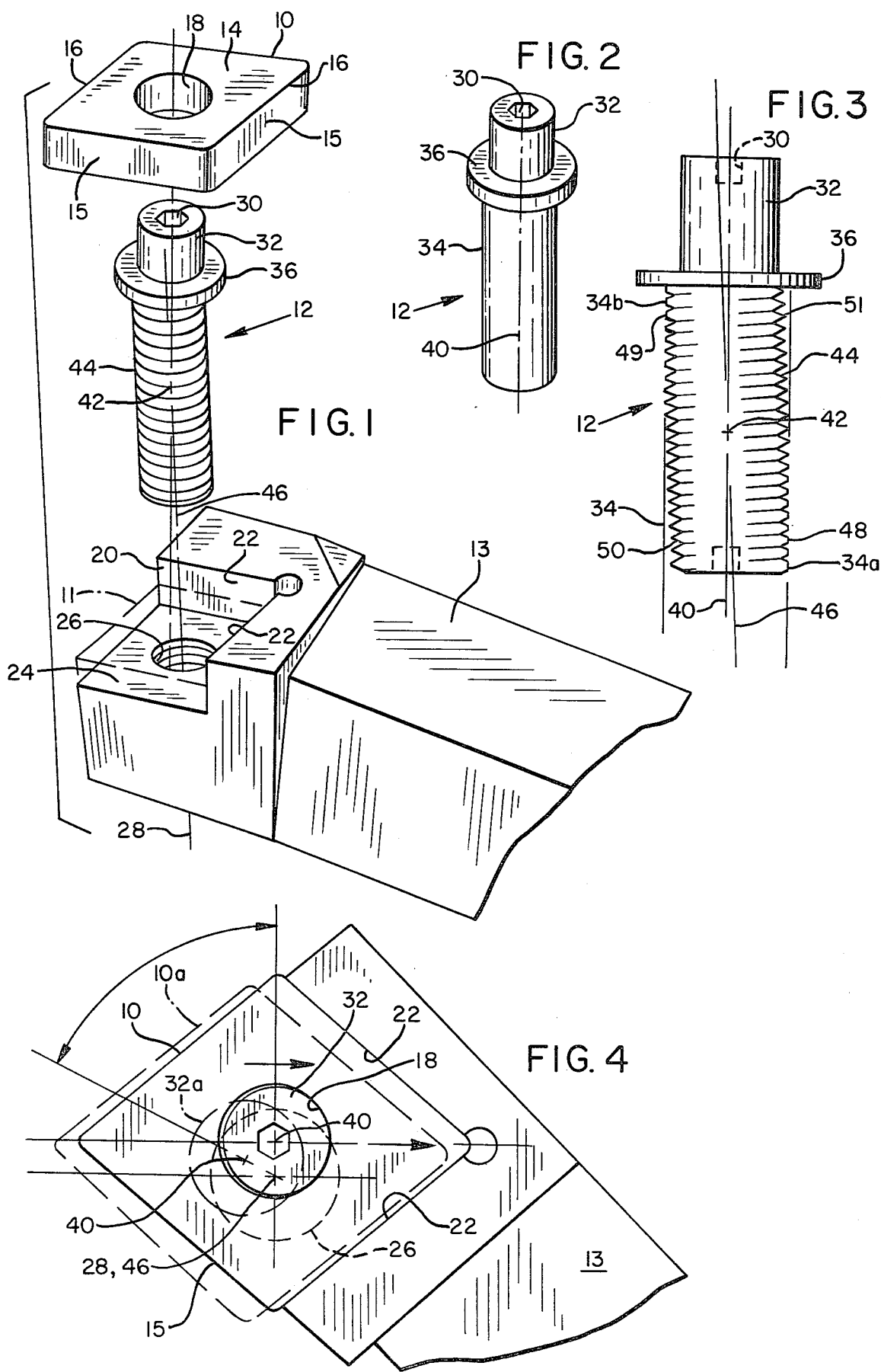

TOOL HOLDER

BACKGROUND OF THE INVENTION

This invention relates to tool holders and more particularly, to tool holders adapted releasably to hold a disposable cutting insert in a seat or recess formed in the shank thereof.

Cutting tools of the aforesaid type typically have three or in some instances four, components—a shank, a retention pin, a disposable cutting insert made of a very hard cutting material such as a suitable metallic carbide, and if necessary, a seat or seating member for the insert. The shank is formed with a recess to provide a seating face and a supporting shoulder for the insert or for the insert and the seating member. The retention pin is typically adjustably secured at one end thereof in a threaded bore formed in the shank. The other end of the pin projects into a hole in the insert. The design of the assemblage is such that as the retention pin is threaded into the bore in the shank, it forces the cutting insert against the supporting shoulder of the shank and locks it in operating position.

Representative patents disclosing tool holders of this type are as follows:

U.S. Pat. No. 3,533,150, Welch, discloses a retention pin which when fully seated, translates axially to cause the head portion thereof to force the cutter insert into snug engagement with the shoulder. U.S. Pat. No. 3,097,417, Hill, discloses a tool holder wherein the retention pin has an eccentrically positioned head portion, whereby rotation of the pin causes the head portion to force an insert against a supporting shoulder.

The following patents utilize retention pins having frusto-conical or wedging portions to force a cutting insert against a supporting shoulder: U.S. Pat. No. 3,284,874, Green et al.; U.S. Pat. No. 3,310,859, Diemond et al.; U.S. Pat. No. 3,341,919, Lovendahl; U.S. Pat. No. 3,613,198, Weber.

U.S. Pat. No. 3,341,920, Kelm, discloses a retention pin which acts as a lever with its fulcrum at its lower or threaded end, laterally to displace its head portion toward a locking shoulder to secure a cutter insert in place. U.S. Pat. No. 3,654,682, Newbould, discloses a retention pin which provides a fulcrum intermediate its ends to force a cutter insert against a shoulder of a recess in the shank.

A principal object of the present invention is to provide a cutting tool of the aforesaid type wherein the retention pin is simpler in design and accordingly, less expensive to fabricate.

A further object of the present invention is to provide a cutting tool of the aforementioned type wherein the bore in the shank has but one axis and thus, requires only one drilling and tapping operation.

A still further object of the present invention is to provide a cutting tool of the aforementioned type wherein the retention pin will tip instead of just laterally translate as it seats the cutter insert snugly against the shoulder of the recess in the shank.

A still further object of the present invention is to provide a cutter tool wherein a retention pin is fabricated from a blank having a cylindrical head portion which initially, is coaxially disposed with respect to the cylindrical body portion of the pin prior to any threading thereof.

SUMMARY OF THE INVENTION

The invention provides a tool holder adapted to hold a disposable cutting insert, the holder including a shank having a recess therein to provide a seating face and at least one supporting shoulder for supporting a cutting insert of the type having an axial hole therein. The shank has a threaded bore which is substantially normal to the seating face and which is adapted for alignment with the hole in the insert.

The holder further includes a threaded retention pin for engaging the threaded bore in the shank, the pin having a cylindrical head portion adapted to engage the hole in the insert.

The pin is initially fabricated from a blank having a cylindrical body portion with a first axis concurrent with the axis of the cylindrical head portion of the pin, the body portion thereafter being threaded on a second axis angularly disposed with respect to the first axis and intercepting the same. Thus, when the thus threaded pin is inserted into the bore, it rotates the head portion about the second axis, thereby to force the cutter insert against the supporting shoulder while drawing the insert into engagement with the seating face.

Preferably, the second angularly disposed axis along which the body portion of the pin is threaded, intersects the first axis thereof at about the mid-point of the cylindrical body portion. Thus, the moment of the force which is achieved as the threaded pin is screwed into the bore, is centered about the mid-length of the body portion, thereby to create a moment arm of maximum length and consequently, a more snug engagement of the insert against the shoulder of the shank than has been possible heretofore.

The second axis on which the body portion of the retention pin is threaded, is preferably disposed at an angle of about two degrees with respect to the first axis of the body portion prior to threading.

The holder may optionally include a seating member adapted to rest on the seating face, wherein the cutting insert is supported by the seating member.

BRIEF DESCRIPTION OF THE DRAWINGS

The invention will be more clearly understood from the following description taken in conjunction with the accompanying drawings, wherein:

FIG. 1 is an exploded perspective view of a tool holder in accordance with the present invention;

FIG. 2 is a perspective view of the blank from which the retention pin is fabricated;

FIG. 3 is a side elevational view of the retention pin of the present invention after it has been threaded;

FIG. 4 is a generally schematic top view of the holder illustrating the cuttting insert in its fully seated position in solid lines and in a released position in dashed lines, the location of the head portion of the retention pin being similarly illustrated for each of such two positions;

DESCRIPTION OF THE PREFERRED EMBODIMENT

Figure 5:
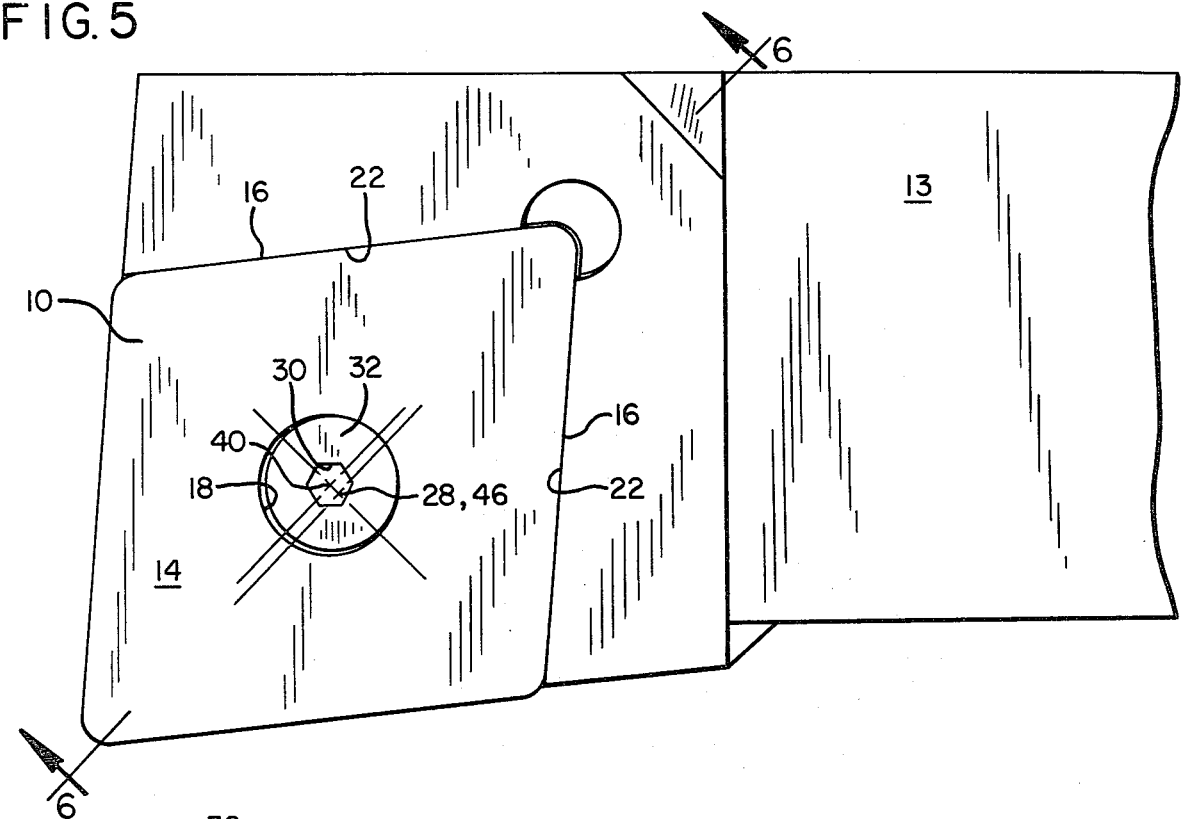
FIG. 5 is a top plan view of the tool holder illustrating the cutting insert in its fully seated position.

Referring to the drawings and particularly to FIG. 1, it can be seen that the tool holder of the present invention comprises four principal parts—a cutting insert 10, a cutting insert seat or seating member 11, a retention pin 12 and a cutting tool shank 13. The cutting insert 10 is of the disposable type, preferably made of a very hard cutting material such as a suitable metallic carbide, and has oppositely spaced parallel faces 14 and peripheral surfaces 15 forming cutting edges 16 as shown. A central hole 18 is formed perpendicular to each of the parallel faces 14.

The cutting tool shank 13 contains a recess 20 at the head portion thereof forming supporting shoulders 22 and a seating face 24. The shank is provided with a threaded bore 26 having an axis 28 which is substantially normal to the seating face 24 and extends completely through that shank, as shown. The terms "upper" and "lower" are used herein with reference to the position of the tool holder and principal parts thereof as they are shown in the drawings. The tool may, of course, assume any position in a cutting or machining operation.

The insert 10 and seat 11 are fastened in the recess 20 by the retention pin 12 which has a hexagonal socket 30 or other suitable means for engaging an adjusting tool, formed in its upper or, if preferred, in its lower end.

The retention pin 12 is illustrated in FIG. 2 in its blank form, i.e., prior to threading. It comprises an upper cylindrical head portion 32 which is adapted to have a slack fit in the hole 18 of the insert 10. The blank further comprises a lower concentric cylindrical body portion 34 and a flange 36 at the junction of the upper and lower cylindrical portions 32, 34, the flange 36 being adapted to fit in a counter bore 38 in the seat 11. Portions 32, 34 and 36 of the pin 12 all have a common axis 40.

The threading of the pin 12 is a feature of the present invention and is illustrated in FIG. 3. It is accomplished by tilting pin 12 about two degrees about the center point 42 of that portion of axis 40 within body portion 34 and then cutting a thread 44 on the resulting tilted axis 46. The center of thread 44 is thus, directly on axis 40 of the blank, but only at point 42. Because the thread axis 46 is tilted with respect to the blank axis 40, a portion 48 of the threads 44 at the lower end 34a of the body portion 34 are cut missing some portions of their apices; the same occurs with respect to a portion 49 of the threads 44 at the upper end 34b of the body portion 34. The remaining portions 50, 51 of the thread 44 at the lower and upper ends 34a and 34b of the body portion 34, respectively, are cut with full apices.

Figure 6:
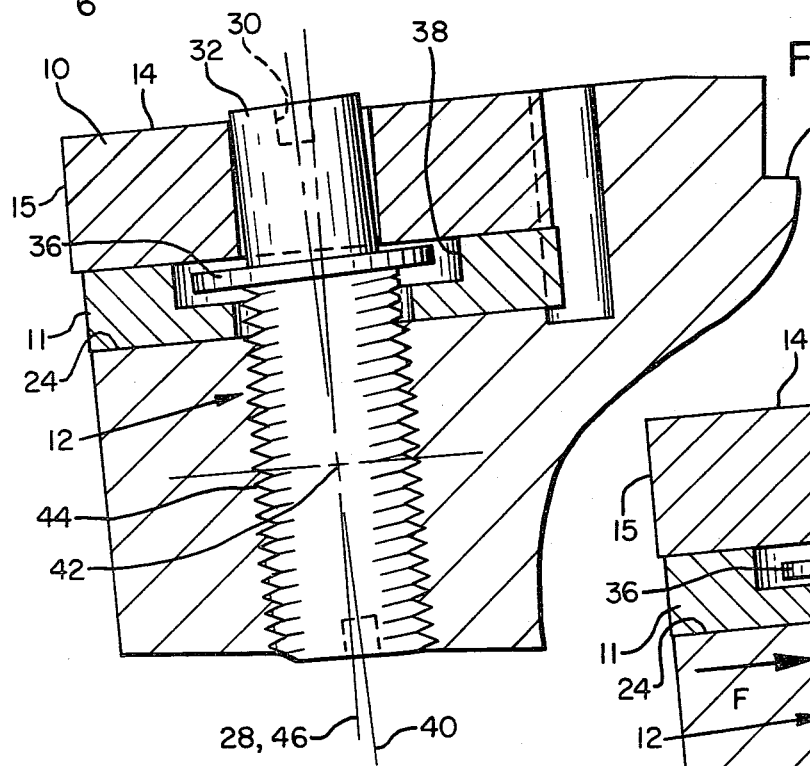
FIG. 6 is a sectional view taken on line 6'6 of FIG. 5 and illustrating the positions of the retention pin and the cutting insert when the latter is in a released position.
Figure 7:
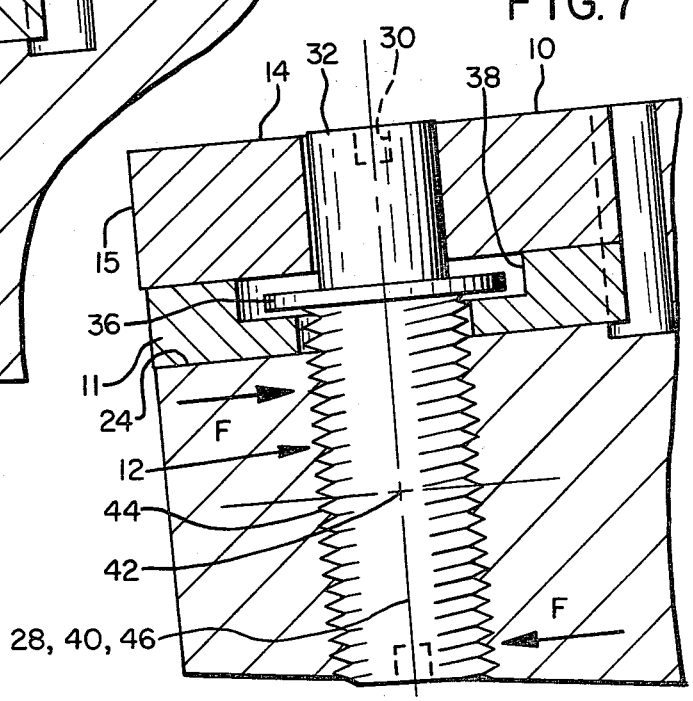
FIG. 7 is a view similar to FIG. 6 taken when the retention pin and cutting insert are in the fully seated position.

FIGS. 4, 5, 6 and 7 illustrate the relationship between the cutting insert 10, retention pin 12 and the threaded bore 26 as pin 12 is inserted into bore 26. Inasmuch as thread 44 is cut on axis 46 which is angularly disposed with respect to axis 40, when pin 12 is inserted into bore 26, head portion 32 rotates about axis 46 as pin 12 draws insert 10 into engagement with seat 11. Thus, when pin 12 is somewhat less than 90° removed from its fully inserted position, head portion 32 is at its maximum outboard position 32a as shown in the dashed lines in FIG. 4 and also in FIG. 6. This position permits easy release of insert 10 so as to facilitate indexing thereof.

As pin 12 is further rotated to achieve its fully seated position, head portion 32 rotates about axis 46 and thus, translates to the right as shown in solid lines in FIG. 4, thereby to force insert 10 against shoulders 22. As viewed in FIG. 7, head portion 32 makes full contact with hole 18, thereby to press insert 10 fully against shoulders 22, the projections of the three axis 28, 40 and 46 falling upon each other. Because the center of thread 44 is directly on blank axis 40 at point 42, a tilting moment about such point is achieved and this moment is centered about point 42, i.e., about the mid-length of the body portion 34 of pin 12. The force vectors of this moment are represented by the arrows F in FIG. 7. The construction creates the maximum moment arm possible and consequently, a very snug engagement of insert 10 against the shoulders 22.

The two degree tilt of axis 46 with respect to axis 40 is not highly critical; the tilting could be $\pm \frac{1}{2}$ degree.

While the invention has been described and illustrated in its preferred embodiment, it should be understood that the invention is not to be limited to the precise details herein illustrated and described, since the same may be carried out in other ways falling within the scope of the following claims.

I claim:

1. In a holder for holding a disposable cutting insert having an axial hole therein, the holder having a shank having a recess therein to provide a seating face and at least one supporting shoulder for supporting the cutting insert, the shank having a threaded bore therein, the bore being substantially normal to the seating face and adapted for alignment with the hole in the insert, and a threaded retention pin engaging the threaded bore, the pin having a cylindrical head portion adapted to engage the hole in the insert, the improvement comprising:
 a retention pin fabricated from a blank having a cylindrical body portion having a first axis concurrent with the axis of the cylindrical head portion,
 the body portion being threaded on a second axis angularly disposed with respect to the first axis and intersecting the same at about the midpoint of the cylindrical body portion,
 whereby the pin when threaded into the bore rotates the head portion about the second axis, thereby to force the cutting insert against the supporting shoulder while drawing the insert into engagement with the seating face.

2. The holder of claim 1 further comprising a seating member adapted to rest on the seating face, the cutting insert being supported by the seating member.

3. The holder of claim 1 wherein the second axis interacts the first axis at about an angle of two degrees.

4. A retention pin fabricated from a blank having a cylindrical head and a cylindrical body portion, the body portion having a first axis concurrent with the axis of the head, the body portion being threaded on a second axis angularly disposed with respect to the first axis and intersecting the same at about the midpoint of the cylindrical body portion, whereby threading the pin into a threaded bore causes the head thereof to rotate about the second axis as the pin is received in the bore.

* * * * *